H. AND L. NILSON.
TRACTION MACHINE.
APPLICATION FILED FEB. 3, 1919. RENEWED JAN. 22, 1920.

1,430,835.

Patented Oct. 3, 1922.
2 SHEETS—SHEET 1.

INVENTORS
HAROLD NILSON
LEONARD NILSON

BY *Paul & Paul*

ATTORNEYS

H. AND L. NILSON.
TRACTION MACHINE.
APPLICATION FILED FEB. 3, 1919. RENEWED JAN. 22, 1920.

1,430,835.  Patented Oct. 3, 1922.
2 SHEETS—SHEET 2.

INVENTORS
HAROLD NILSON.
LEONARD NILSON.

BY Paul & Paul
ATTORNEYS

Patented Oct. 3, 1922.

1,430,835

UNITED STATES PATENT OFFICE.

HAROLD NILSON AND LEONARD NILSON, OF WAYZATA, MINNESOTA.

TRACTION MACHINE.

Application filed February 3, 1919, Serial No. 274,668. Renewed January 22, 1920. Serial No. 353,386.

*To all whom it may concern:*

Be it known that we, HAROLD NILSON and LEONARD NILSON, citizens of the United States, residents of Wayzata, county of Hennepin, State of Minnesota, have invented certain new and useful Improvements in Traction Machines, of which the following is a specification.

This invention relates to a traction machine of the type shown and described in our pending application for Letters Patent of the United States, Serial No. 260,202, filed October 29, 1918, in which the forward portion of the frame has a horizontal pivot on the forward axle and the rear portion of the frame is rigidly supported on the rear axle, with a low-down center of gravity to the end that when the machine is moving on a side hill the weight of the engine will be thrown to the upside of the machine.

Our present invention consists in an improved frame for this type of traction machine mounted in substantially the same way and described in our pending application and oscillating on a side hill in the same manner.

A further and particular object is to provide a type of frame which will be rigidly braced against any racking or twisting strain to which the machine may be subjected when used on uneven ground.

The invention consists generally in various constructions and combinations, all as hereinafter described and particularly pointed out in the claims.

In the accompanying drawings forming part of this specification.

Figure 1:
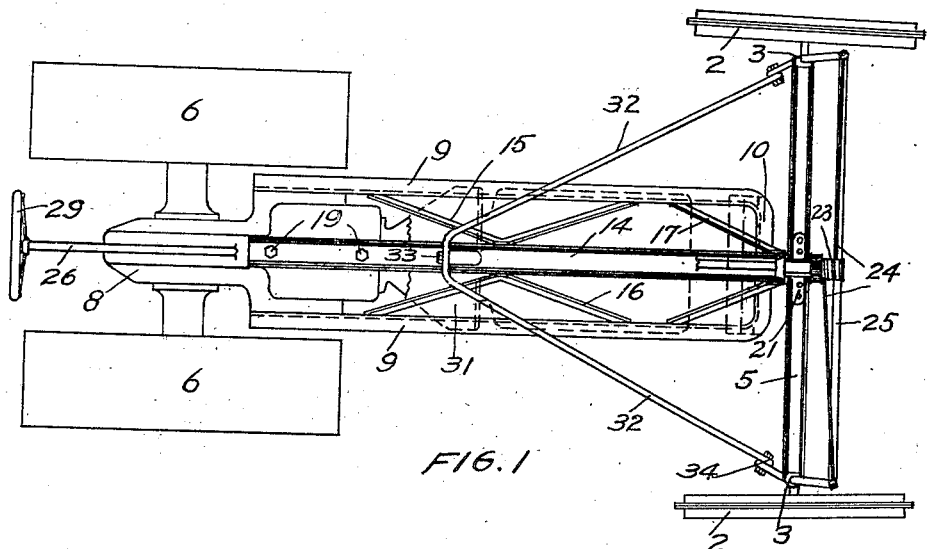
Figure 2:
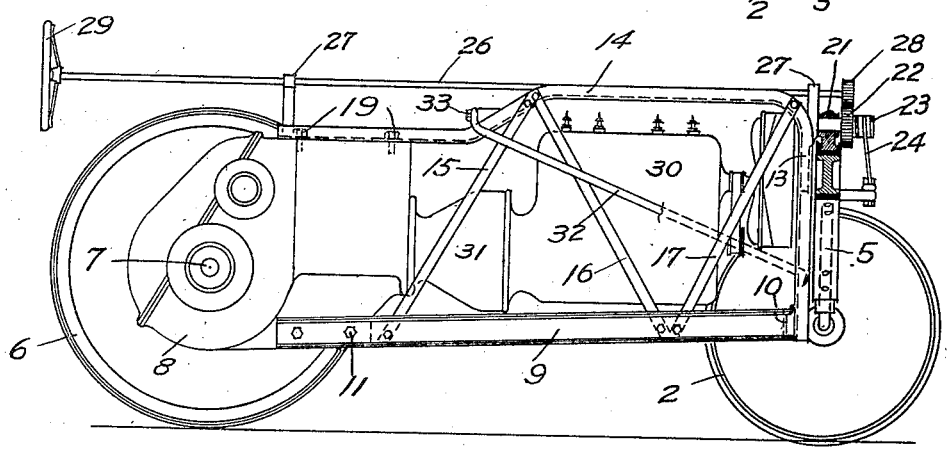
Figure 3:
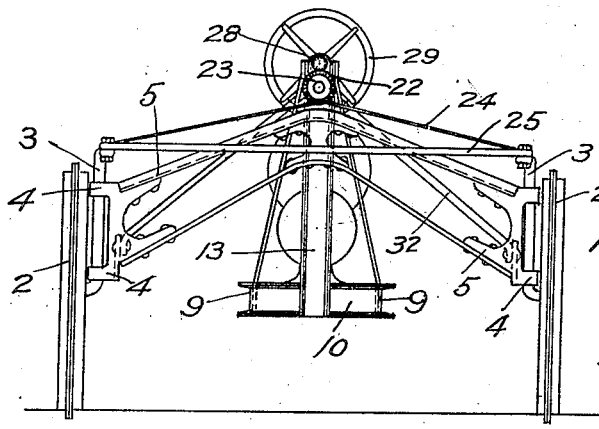
Figure 4:
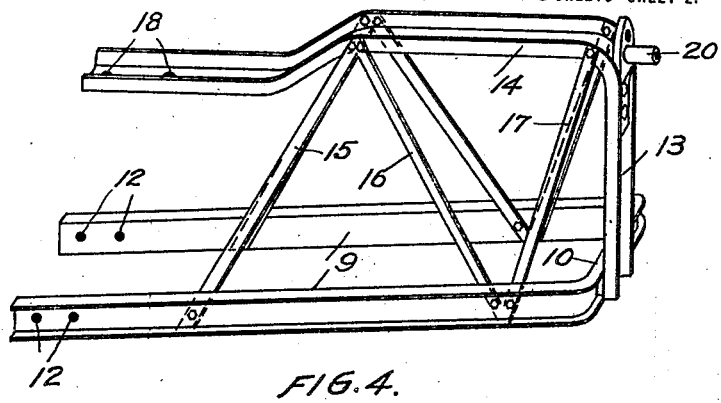
Figure 5:
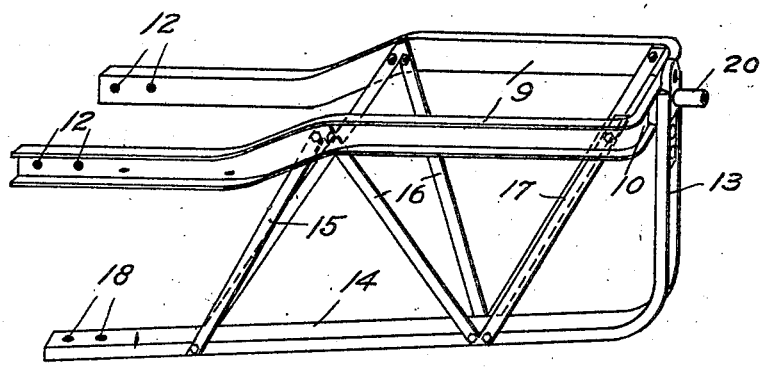
Figure 6:
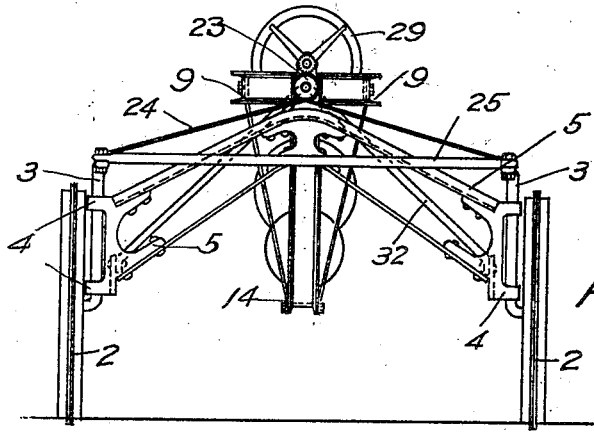

Figure 1 is a plan view of a traction machine embodying our invention,

Figure 2 is a side elevation of the same, with the forward portion partially in section, showing the horizontal pivot on the forward axle, Figure 3 is a front elevation of the machine, Figure 4 is a perspective view of the machine frame, Figure 5 is a similar view of the frame shown in Figure 4 in an inverted position, Figure 6 is a front elevation, showing the frame of Figure 3 in an inverted position.

In the drawing, 2 represents the forward guiding wheels of the machine, having spindles 3 mounted in vertical bearings 4 at the ends of the forward axle 5. 6 are the rear traction wheels mounted on the rear axle 7 that is journaled in bearings in the transmission casing or housing 8. The frame, which we prefer to illustrate in this application, consists of a lower portion composed preferably of channel bar having parallel side rails 9 and a forward or end rail 10. This portion of the frame is substantially U-shaped in form and the transmission housing 8 is arranged between the rear ends of the rails 9 and is secured thereto by bolts 11 fitting holes 12 in said rails. A third rail is secured to the middle portion of the end 10 and is also preferably composed of channel bar and has a vertical part 13 projecting above the part 10 a predetermined distance and then bent backwardly and downwardly to form a substantially horizontal top rail 14 intermediate to the rails 9 and preferably midway between them. These upper and lower rails 9 and 14 are rigidly held in position by truss bars 15, 16, and 17 extending diagonally between the rails and bolted or riveted thereto. The rear portion of the rail 14 extends over the transmission casing 8 and has bolt holes 18 therein by means of which and bolts 19 the rail is secured to the top of the casing, thus the rear axle, the transmission casing and the frame are rigidly secured together.

At the top of the part 13 we provide a horizontal pivot pin 20 journaled in a bearing 21 in the forward axle and gear wheel 22 is journaled concentric with the pivot 21 and has a hub 23 on which a cable 24 is wound and connected at its ends with the spindles 3, a bar 25 extending across the machine and pivotally connected with the crank arm of said spindles for simultaneous movement thereof. A steering post 26 is journaled in supporting standards 27 on the machine frame and provided with a pinion 28 which meshes with the gear 22 so that the operator at the rear of the machine, grasping the steering wheel 29, may revolve the steering post and oscillate the guide wheels on a vertical axis to steer the machine.

In the forward portion of the machine frame we mount the engine 30 below the pivot 20 and on a level substantially with the transmission casing and connected therewith by a suitable housing 31. The manner of mounting the engine, however, is not claimed in this application and we will not, therefore, enter into the details thereof.

The center of gravity of the machine frame and the source of motive power carried thereby is considerably below the pivot of the frame on the forward axle and the machine will not only be more stable when running on level ground but on a hillside when the rear wheels are tilted the machine frame will swing on its forward pivot toward the up side of the machine and the load on the frame will counteract any tendency of the machine to tip over. We prefer to provide brace rods 32 having a pivot 33 on the machine frame that is concentric with the pivot 20, the other ends of the rods being secured at 34 to arms which extend backwardly from the guiding wheel spindles. This feature of the machine is fully shown and described in our application above referred to.

We claim as our invention:

1. A traction machine comprising a frame triangular in cross section and of relatively greater depth than width, a rear axle mounted in said frame, traction wheels for said axle, a forward axle and wheels therefor, said frame having a horizontal pivotal bearing on said forward axle for lateral oscillation and a non-oscillating bearing on said rear axle, a source of motive power carried by said frame below said horizontal bearing and having driving connections with said traction wheels, the lower weighted portion of said frame swinging toward the higher side of the machine to counteract the tendency to tip toward the lower side when traveling on a side hill.

2. A traction machine comprising a frame composed of top and bottom rails and of relatively greater depth than width, a rear axle mounted in said frame, traction wheels for said axle, a forward axle and wheels therefor, said frame having a horizontal pivotal bearing on said forward axle for lateral oscillation and a non-oscillating bearing on said rear axle, a source of motive power carried by said frame below said horizontal bearing and having driving connections with said traction wheels, the lower heavier portion of said frame swinging toward the higher side of the machine when traveling on a side hill to counteract any tendency to tip toward the lower side.

3. A traction machine comprising a frame composed of lower parallel side rails and a forward end rail between them, an upper rail having a downwardly turned forward end secured to the middle portion of said end rail, truss bars secured to said upper and lower rails, a transmission casing secured to the rear portion of said upper and lower rails, a rear axle journaled in said transmission casing and traction wheels for said rear axle, the forward portion of said upper rail having a horizontal pivot pin thereon, a forward axle having guide wheels and a bearing for said pivot pin, and a source of motive power mounted between said lower rails below the level of said pivot pin and having a driving connection with said traction wheels through said transmission casing.

4. A traction machine comprising a frame having a lower portion composed of a channel bar bent to a substantially U-shaped form, with parallel side rails and a forward end rail, a single channel bar having a vertical portion secured to said forward end rail and projecting upwardly therefrom and having a horizontal portion forming the top rail of the frame extending backwardly midway substantially between said side rails, suitable truss braces between said top and bottom rails, a transmission casing secured to said rails, a rear axle journaled therein and traction wheels therefor, a forward axle and guiding wheels, said upper rail at the intersection of its horizontal and vertical portions having a horizontal pivot pin journaled in said forward axle for lateral oscillation of said frame thereon, an engine carried by said frame below said pivot pin, and having driving connections with said axle through said transmission casing.

5. A traction machine comprising a frame triangular in cross section and of relatively greater depth than width, a rear axle mounted in said frame, traction wheels for said axle, a forward axle and wheels therefor, said frame having a horizontal pivotal bearing on said forward axle for limiting oscillation and a non-oscillating bearing on said rear axle, a source of motive power carried by said frame below said horizontal bearing and having driving connections with said traction wheels, the lower weighted portion of said frame swinging toward the higher side of the machine to counter-act the tendency to tip toward the lower side when traveling on a side hill, brace rods connected at their forward ends to said wheel spindles and having a pivotal connection at their rear ends on said frame concentric with the pivot of said frame on said forward axle.

6. A traction machine comprising a frame of relatively greater depth than width comprising upper and lower rails and bracing means between them, a rear traction wheel, forward guiding wheels, said frame having a horizontal pivotal bearing on the supports of said forward wheels for lateral oscillation, and a non-oscillating bearing with respect to said traction wheel, a source of motive power carried by said frame below said horizontal bearing and having driving connections with said traction wheel, the lower heavier portion of said frame swinging toward the higher side of the machine when traveling on a side hill to counteract any tendency to tip toward the lower side.

7. A traction machine comprising a frame of relatively greater depth than width comprising upper and lower rails and bracing means between them, a rear axle mounted in said frame, traction wheels for said axle, a forward axle and wheels therefor, said frame having a horizontal pivotal bearing on said forward axle for lateral oscillation and a non-oscillating bearing on said rear axle, a source of motive power carried by said frame below said horizontal bearing and having driving connections with said traction wheels, the lower heavier portion of said frame swinging toward the higher side of the machine when traveling on a side hill to counteract any tendency to tip toward the lower side.

8. A traction machine comprising a frame, triangular in cross section, a rear axle mounted in said frame, traction wheels for said axle, a forward axle and wheels therefor, said frame having a horizontal pivotal bearing on said forward axle for lateral oscillation and a non-oscillating bearing on said rear axle, a source of motive power carried by said frame below said horizontal bearing and having driving connections with said traction wheel, the lower weighted portion of said frame swinging toward the higher side of the machine to counteract the tendency to tip toward the lower side when traveling on a side hill.

In witness whereof, we have hereunto set our hands this 27th day of January, 1919.

HAROLD NILSON.
LEONARD NILSON.